(12) United States Patent
Li et al.

(10) Patent No.: US 11,004,382 B2
(45) Date of Patent: May 11, 2021

(54) BACKLIGHT SOURCE AND MANUFACTURE METHOD THEREOF, DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Yafei Li, Beijing (CN); Bo Gao, Beijing (CN); Pei Li, Beijing (CN); Guangquan Wang, Beijing (CN); Haiwei Sun, Beijing (CN); Ming Chen, Beijing (CN); Xue Dong, Beijing (CN); Wenjia Sun, Beijing (CN); Jinxing Liu, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/423,620

(22) Filed: May 28, 2019

(65) Prior Publication Data

US 2020/0074917 A1 Mar. 5, 2020

(30) Foreign Application Priority Data

Sep. 4, 2018 (CN) .......................... 201811025381.3

(51) Int. Cl.
*G09G 3/22* (2006.01)
*H05K 5/00* (2006.01)

(52) U.S. Cl.
CPC ............. *G09G 3/22* (2013.01); *H05K 5/0017* (2013.01)

(58) Field of Classification Search
CPC .. G09G 3/22; H05K 5/0017; G02F 1/133603; G02F 2001/133612; G02F 2001/133601
See application file for complete search history.

(56) References Cited

U.S. PATENT DOCUMENTS 8,207,953 B2 6/2012 Yamamura et al.
10,204,567 B2 2/2019 Yang et al.
(Continued)

FOREIGN PATENT DOCUMENTS

CN 102057420 A 5/2011
CN 102290031 A 12/2011
(Continued)

OTHER PUBLICATIONS

First Chinese Office Action from Chinese Patent Application No. 201811025381.3 dated Dec. 20, 2020.

*Primary Examiner* — Carolyn R Edwards
(74) *Attorney, Agent, or Firm* — Dilworth & Barrese, LLP.; Michael J. Musella, Esq.

(57) ABSTRACT

A backlight source and a manufacture method thereof, a display device are provided. The backlight source includes a base substrate, the base substrate is divided into a plurality of light emitting regions, and at least one of the plurality of light emitting regions comprises a plurality of light emitting elements, a first common polar line, and a second common polar line. Light emitting brightness of at least one of the light emitting regions is adjustable independently.

16 Claims, 5 Drawing Sheets

(56) References Cited

U.S. PATENT DOCUMENTS

| | | | | |
|---|---|---|---|---|
| 2007/0115228 A1* | 5/2007 | Roberts | ............... | H05B 45/00 |
| | | | | 345/82 |
| 2008/0003706 A1* | 1/2008 | Yoo | ............... | H01L 51/56 |
| | | | | 438/22 |
| 2010/0220048 A1* | 9/2010 | Yamamura | ............... | G09G 3/3426 |
| | | | | 345/102 |
| 2011/0227503 A1* | 9/2011 | Yuan | ............... | H05B 45/46 |
| | | | | 315/294 |
| 2012/0223657 A1* | 9/2012 | Van de Ven | ............... | H05B 45/20 |
| | | | | 315/297 |
| 2015/0359062 A1* | 12/2015 | Dau | ............... | H05B 47/16 |
| | | | | 315/153 |
| 2016/0349548 A1* | 12/2016 | Xu | ............... | G09G 3/3607 |

FOREIGN PATENT DOCUMENTS

| | | | |
|---|---|---|---|
| CN | 103035830 | A | 4/2013 |
| CN | 105609058 | A | 5/2016 |
| CN | 106940493 | A | 7/2017 |

\* cited by examiner

BACKLIGHT SOURCE AND MANUFACTURE METHOD THEREOF, DISPLAY DEVICE

CROSS-REFERENCE

The present application claims priority of Chinese patent application No. 201811025381.3, filed on Sep. 4, 2018, the disclosure of which is incorporated herein by reference as part of the application.

TECHNICAL FIELD

At least one embodiment of the present disclosure relates to a backlight source and a manufacture method thereof, a display device.

BACKGROUND

As a flat panel display device, the TFT-LCD (Thin Film Transistor Liquid Crystal Display) has characteristics of small volume, low power consumption, no radiation, and relatively low manufacture cost, and so on, and is used increasingly in the field of high performance display.

Arrangement manners of a backlight assembly of the TFT-LCD comprise a direct type and an edge type. Currently, in the direct type backlight assembly (BLU), a light emitting element arranged on a flexible printed circuit (FPC) or a printed circuit board (PCB) is provided.

SUMMARY

At least one embodiment of the present disclosure provides a backlight source, which comprises a base substrate, the base substrate is divided into a plurality of light emitting regions, and at least one of the plurality of light emitting regions comprises a plurality of light emitting elements, a first common polar line, and a second common polar line. Light emitting brightness of at least one of the light emitting regions is adjustable independently.

For example, in a backlight source provided by at least one embodiment of the present disclosure, in an identical light emitting region, first poles of the plurality of light emitting elements are electrically connected to an identical first common polar line, and second poles of the plurality of light emitting elements are electrically connected to an identical second common polar line.

For example, a backlight source provided by at least one embodiment of the present disclosure further comprises a plurality of first wires and a plurality of second wires on the base substrate, the first common polar lines of at least two of the plurality of light emitting regions are electrically connected to different first wires, and the second common polar lines of at least two of the plurality of light emitting regions are electrically connected to an identical second wire.

For example, in a backlight source provided by at least one embodiment of the present disclosure, the first common polar lines of any two of the plurality of light emitting regions are electrically connected to different first wires, and the second common polar lines of at least two of the plurality of light emitting regions are electrically connected to an identical second wire.

For example, in a backlight source provided by at least one embodiment of the present disclosure, each of the plurality of light emitting regions is provided with i×j light emitting elements arranged in an array; where i≥2, j≥1, i and j are positive integers, i light emitting elements in an identical row are connected in series, and first poles of the plurality of light emitting elements connected in series of j rows are electrically connected to the first common polar line, and second poles of the plurality of light emitting elements connected in series of j rows are electrically connected to the second common polar line.

For example, in a backlight source provided by at least one embodiment of the present disclosure, the backlight source comprises n×m light emitting regions arranged in an array; where n≥2, m≥1; n and m are positive integers. The first common polar lines of m light emitting regions in an identical column are electrically connected to m different first wires, respectively; and the second common polar lines of n light emitting regions in different columns and in an identical row are electrically connected to n different second wires, respectively; the second common polar lines of the m light emitting regions in the identical column are electrically connected to an identical second wire.

For example, in a backlight source provided by at least one embodiment of the present disclosure, the backlight source comprises n×m light emitting regions arranged in an array; where n≥2, m≥1; n and m are positive integers. The first common polar lines of m light emitting regions in an identical column are electrically connected to m different first wires, respectively; and the second common polar lines of n light emitting regions in different columns and in an identical row are electrically connected to n different second wires, respectively; for the m light emitting regions in the identical column, the second common polar lines of the light emitting regions in odd-numbered rows are electrically connected to an identical second wire; the second common polar lines of the light emitting regions in even-numbered rows are electrically connected to an identical second wire; and the second wire connected to the second common polar lines of the light emitting regions in the odd-numbered row and the second wire connected to the second common polar lines of the light emitting regions in the even-numbered rows are different.

For example, in a backlight source provided by at least one embodiment of the present disclosure, the backlight source comprises n×m light emitting regions arranged in an array; where n≥2, m≥1; n and m are positive integers. The first common polar lines of m light emitting regions in an identical column are electrically connected to L different first wires, respectively, and L is a positive integer greater than 0 and less than or equal to m−1; the second common polar lines of n light emitting regions in different columns and in an identical row are electrically connected to p different second wires, respectively, and p is a positive integer greater than 0 and less than or equal to n−1; at least two of the m light emitting regions in the identical column are connected to an identical first wire, and at least two of the n light emitting regions in the identical row are connected to an identical second wire.

For example, a backlight source provided by at least one embodiment of the present disclosure further comprises a plurality of lead pins electrically connected to the first wires on the base substrate, and the lead pins are connected to a first driving circuit for providing a driving voltage to the first pole of the light emitting element.

For example, in a backlight source provided by at least one embodiment of the present disclosure, a line width of the first wire is proportional to a length of the first wire; and a ratio of the line width to the length of any two of the first wires is identical.

For example, in a backlight source provided by at least one embodiment of the present disclosure, the first common polar line and the second common polar line are in an identical layer, and are made of an identical material.

For example, in a backlight source provided by at least one embodiment of the present disclosure, the first common polar line and the first wire are in different layers; the backlight source further comprises an insulating layer on the base substrate, and the insulating layer is between the first common polar line and the first wire; the insulating layer is provided with a plurality of first via holes; and the first wire is electrically connected to the first common polar line through the first via hole.

For example, in a backlight source provided by at least one embodiment of the present disclosure, the second wire and the first wire are in an identical layer and are made of an identical material; the insulating layer is provided with a plurality of second via holes; and the second wire is electrically connected to the second common polar line through the second via hole.

For example, a backlight source provided by at least one embodiment of the present disclosure further comprises a solder resist white oil on a side, that is away from the base substrate, of the first wire or the second wire.

For example, a backlight source provided by at least one embodiment of the present disclosure further comprises an adhesive layer between the base substrate and the first common polar line.

For example, in a backlight source provided by at least one embodiment of the present disclosure, the base substrate is a glass substrate, a sapphire substrate, a ceramic substrate or an organic resin substrate.

At least one embodiment of the present disclosure provides a display device, which comprises a display panel and a backlight assembly, the backlight assembly comprises the backlight source according to any one of the above backlight sources; and the base substrate of the backlight source is parallel to a light emitting surface of the display panel.

At least one embodiment of the present disclosure provides a manufacture method of a backlight source, which comprises: providing a base substrate, and dividing the base substrate into a plurality of light emitting regions; and forming a plurality of light emitting elements, a first common polar line, and a second common polar line in at least one of the plurality of light emitting regions; in an identical light emitting region, first poles of the plurality of light emitting elements are electrically connected to the first common polar line, and second poles of the plurality of light emitting elements are electrically connected to the second common polar line.

For example, in a manufacture method of a backlight source provided by at least one embodiment of the present disclosure, the forming of the plurality of light emitting elements, the first common line, and the second common line in at least one of the light emitting regions comprises: forming the first common polar line and the second common polar line in each of the light emitting regions by one patterning process on the base substrate; forming an insulating layer on the first common polar line and the second common polar line, and forming a plurality of first via holes and a plurality of second via holes by a patterning process; forming a plurality of first wires and a plurality of second wires by one patterning process on the insulating layer; wherein the first wire is connected to the first common polar line through the first via hole; and the second wire is electrically connected to the second common polar line through the second via hole; and forming a plurality of light emitting elements in each of the light emitting regions.

For example, in a manufacture method of a backlight source provided by at least one embodiment of the present disclosure, the plurality of light emitting elements in each of the light emitting regions are formed by a transfer printing process.

BRIEF DESCRIPTION OF THE DRAWINGS

In order to demonstrate clearly technical solutions of the embodiments of the present disclosure, the accompanying drawings in relevant embodiments of the present disclosure will be introduced briefly. It is apparent that the drawings may only relate to some embodiments of the disclosure and not intended to limit the present disclosure.

REFERENCE NUMERALS

01—backlight source; 10—base substrate; 100—light adjusting region; 21—first wire; 22—second wire; 30—light emitting element; 41—first common polar line; 42—second common polar line; 51—multiplexer; 52—lead pin; 60—insulating layer; 61—first via hole; 62—second via hole; 70—adhesive layer; 71—solder resist white oil; 200—display panel; 201—backlight assembly.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is apparent that the described embodiments are just a part but not all of the embodiments of the disclosure. Based on the described embodiments herein, those skilled in the art may obtain other embodiment, without any creative work, which shall be within the scope of the disclosure.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "comprise/comprising," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may comprise an electrical connection/coupling, directly or indirectly. The terms, "on," "under," "left," "right," or the like are only used to indicate relative position relationship, and when the position of the object which is described is changed, the relative position relationship may be changed accordingly.

As illustrated above, in a direct type backlight assembly, light emitting elements are usually arranged on a flexible circuit board (FPC) or a printed circuit board (PCB). Because the FPC or the PCB is prone to warpage, the light emitting element at the warpage position cannot emit light, thereby reducing the yield of the backlight assembly.

Embodiments of the present disclosure provides a backlight source and a manufacture method thereof, and a display device, which can solve the problem that the FPC or the PCB in the direct type backlight assembly is warped, resulting that a portion of the light emitting elements cannot emit light.

In the following, the backlight and the manufacture method thereof, and the display device provided by the embodiments of the present disclosure will be described in detail with reference to the accompanying drawings.

Figure 1:
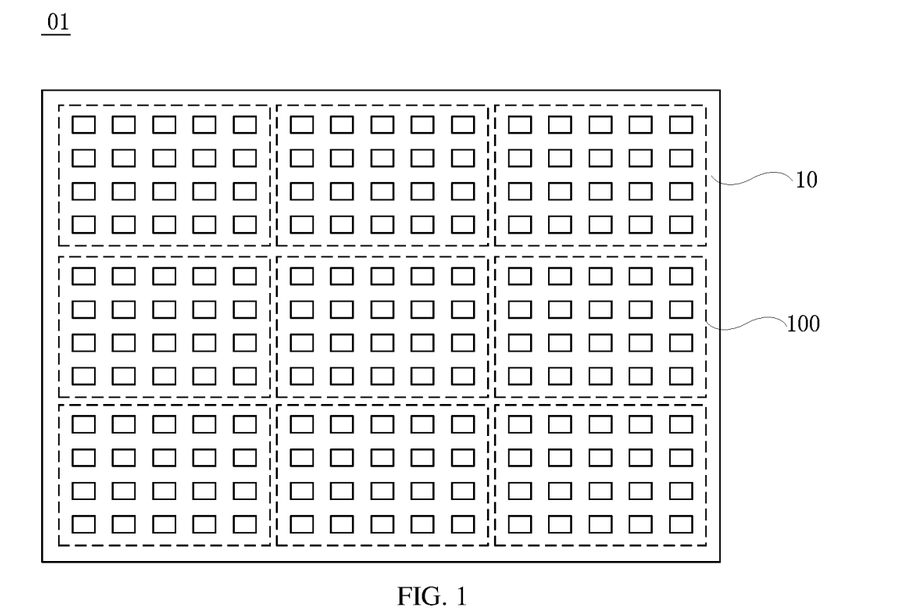
FIG. 1 is a structure diagram of a backlight source provided by at least one embodiment of the present disclosure.

As illustrated in FIG. 1, some embodiments of the present disclosure provide a backlight source 01, the backlight source 01 comprises a base substrate 10. The base substrate 10 may be a glass substrate or a substrate made of a transparent or translucent material and of which the hardness is substantially equivalent to the glass substrate, such as a sapphire substrate, a ceramic substrate, or a substrate made of an organic resin material.

As illustrated in FIG. 1, the base substrate 10 is divided into a plurality of light emitting regions 100, and at least one of the plurality of light emitting regions 100 comprises a plurality of light emitting elements 30, a first common polar line 41, and a second common polar line 42, and light emitting brightness of the at least one of the light emitting regions is adjustable independently.

For example, light emitting brightness of at least two light emitting regions is adjustable independently from each other. For example, light emitting brightness of each of the plurality of light emitting regions may be adjustable independently from each other. Hereinafter, the light emitting region 100 may also be referred as a light adjusting region 100. For example, a local dimming technique may be employed to independently adjust the light emitting brightness of the light adjusting region 100 as needed, so as to make the display image have larger light and dark dynamic range and more image details, thereby presenting an image of better quality effects to users. In addition, the light adjusting region 100 corresponding to the display dark region may be controlled not to emit light, thereby achieving the purpose of reducing power consumption.

Figure 2:
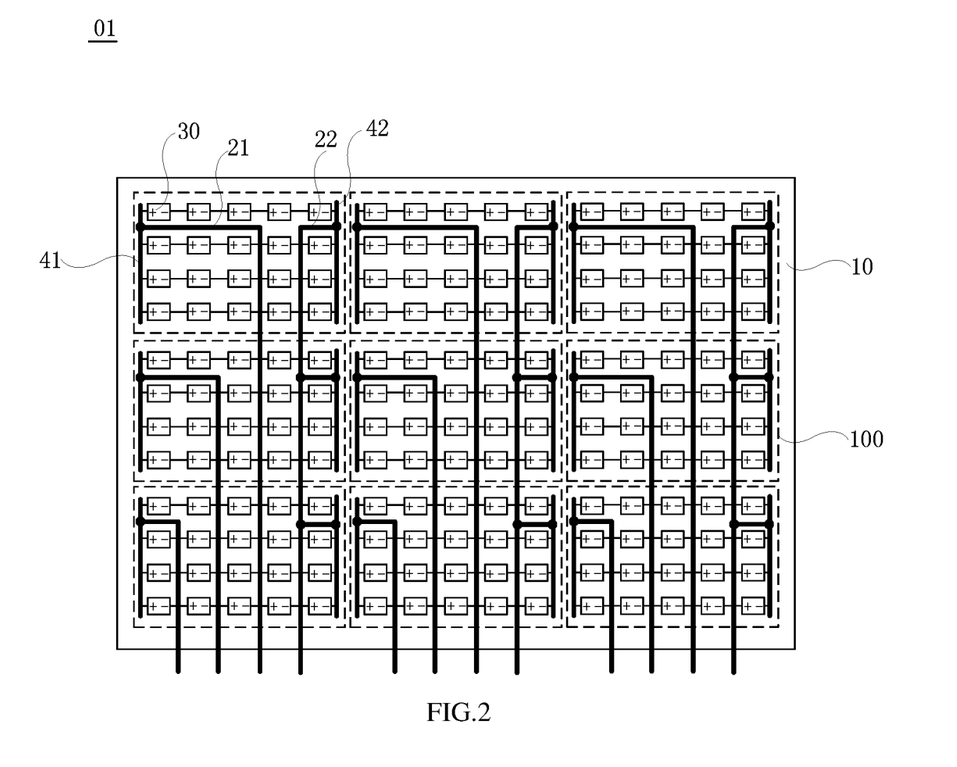
FIG. 2 is a structure diagram of another backlight source provided by at least one embodiment of the present disclosure.

For example, as illustrated in FIG. 2, the backlight source 01 further comprises a plurality of light emitting elements 30, a first common polar line 41, and a second common polar line 42 in at least one of the plurality of light adjusting regions 100. For example, it is illustrated in FIG. 2 that each of the light adjusting regions 100 comprises a plurality of light emitting elements 30, a first common polar line 41, and a second common polar line 42.

For example, in a same light adjusting region 100, first poles of the plurality of light emitting elements 30 are electrically connected to a same first common polar line 41, and second poles of the plurality of light emitting elements 30 are electrically connected to a same second common polar line 42.

For example, the light emitting element 30 may be a micro light emitting element. The micro light emitting element has a size of no more than 100 micrometers, that is, a side length, a diameter, or a maximum extension length in a certain direction of the micro light emitting element 30 is not more than 100 micrometers, and the micro light emitting element may be, for example, a mini-LED or a micro-LED. In this case, the volume of the micro light emitting element is relatively small, and a spacing distance between two adjacent micro light emitting elements may also be set to be small. In this case, the brightness of an overlapping portion of light emitted by the adjacent two micro light emitting elements is equivalent to the brightness of light emitted by a single micro light emitting element, so that the backlight source 01 comprising the plurality of micro light emitting elements is a surface light source with uniform brightness.

For example, the first pole of the above light emitting element 30 may be an anode (indicated by "+"), the second pole is a cathode (indicated by "−"); alternatively, the first pole is a cathode, and the second pole may be an anode. Hereinafter, in order to illustrate conveniently, the case that the first pole of the light emitting element 30 is an anode and the second pole is a cathode is taken as an example to illustrate. In this case, the plurality of light emitting elements 30 in the same light adjusting region 100 realize a common anode through the same first common polar line 41, and realize a common cathode through the same second common polar line 42.

For example, the backlight source 01 further comprises a plurality of first wires 21 and a plurality of second wires 22 arranged on the base substrate 10. For example, the first common polar lines 41 of at least two light adjusting regions 100 are electrically connected to different first wires 21, and the second common polar lines 42 of at least two light adjusting regions 100 are electrically connected to a same second wire 22.

For example, as illustrated in FIG. 2, the first common polar lines 41 of any two light adjusting regions 100 are electrically connected to different first wires 21, and the second common polar lines 42 of a plurality of light adjusting regions 100 are electrically connected to a same second wire 22. In this case, a voltage may be supplied to the first pole of each of the light emitting elements 30 in the light adjusting regions 100 electrically connected to the first wire 21 through the first wire 21, and a voltage may be supplied to the second pole of each of the light emitting elements 30 in the light adjusting regions 100 electrically connected to the second wire 22 through the second wire 22, thereby achieving control of the brightness of each of the light emitting regions 100.

As seen from the above, a driving circuit for driving the light emitting elements 30 in the light adjusting region 100 to emit light mainly comprises the first wire 21, the second wire 22, the first common polar line 41, and the second common polar line 42. In addition, the above driving circuit is formed on the base substrate 10, and the light emitting element 30, such as the micro light emitting element, is also formed on the base substrate 10. The base substrate 10 may be made of a relatively hard inorganic or organic material, which is less prone to warpage, thereby reducing the probability of contact failure between a portion of the light emitting elements 30 and the above driving circuit, and improving the yield of the backlight source 01.

Figure 3:
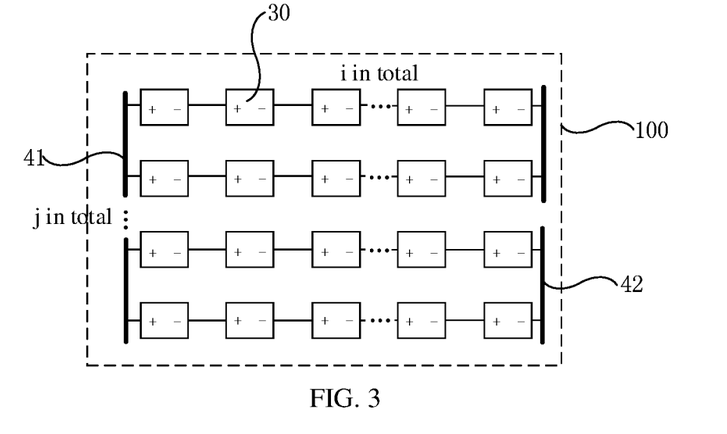
FIG. 3 is a structure diagram of a light adjusting region in FIG. 2.

For example, in some embodiments of the present disclosure, in order to allow the first poles of the plurality of light emitting elements 30 in the same light adjusting region 100 to be electrically connected to the first common polar line 41, and allow the second poles to be electrically connected to the second common polar line 42, as illustrated in FIG. 3, each light adjusting region 100 is provided with i×j light emitting elements 30. Where i≥2, j≥1; i and j are positive integers.

For example, i light emitting elements 30 in a same row are connected in series. In addition, first poles of the plurality of light emitting elements 30 connected in series of j rows are electrically connected to the first common polar line 41, and second poles are electrically connected to the second common polar line 42. As illustrated in FIG. 3, in each row, from left to right, the first pole of the first light emitting element 30 is electrically connected to the first common polar line 41, and the second pole of the last light emitting element 30 is electrically connected to the second common polar line 42. In addition, in each row, from left to right, except for the first and last light emitting elements 30, a second pole of a former light emitting element 30 is electrically connected to a first pole of the latter light emitting element 30.

Figure 4:
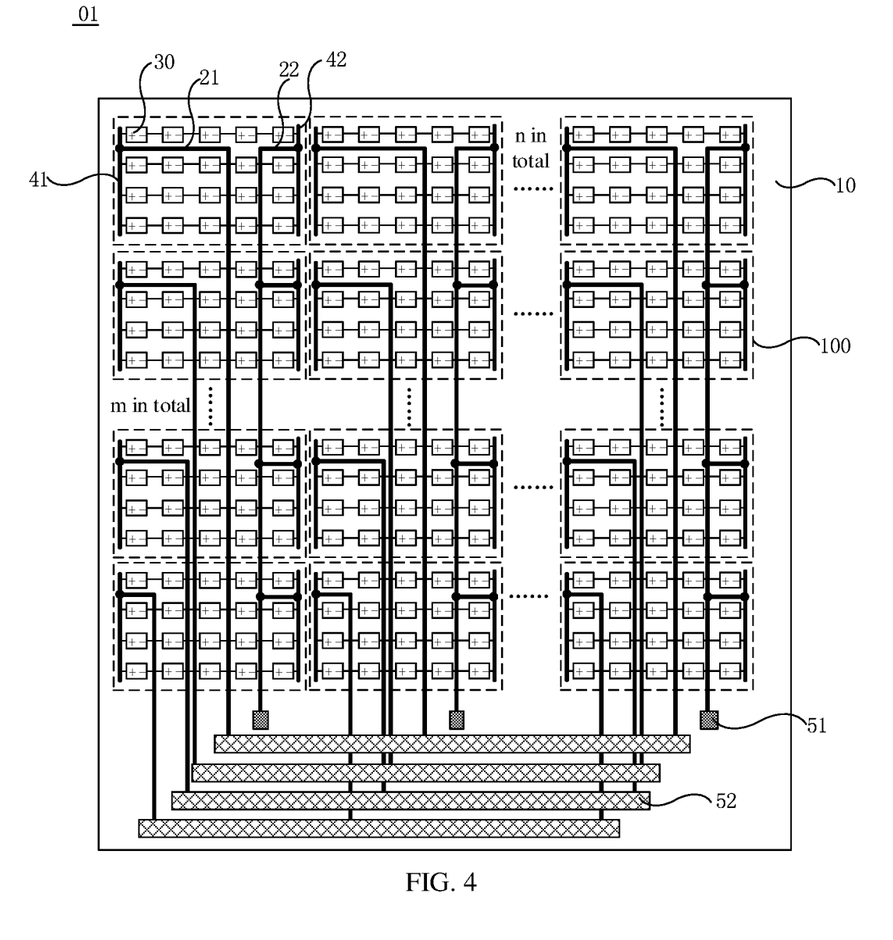
FIG. 4 is a structure diagram of another backlight source provided by at least one embodiment of the present disclosure.

In addition, in some embodiments of the present disclosure, the arrangement method of the plurality of light adjusting regions 100 may be such that the backlight source 01 comprises n×m light adjusting regions 100 as illustrated in FIG. 4. Where n≥2, m≥1; n and m are positive integers.

For example, as illustrated in FIG. 4, first common polar lines 41 of m light adjusting regions 100 in a same column are electrically connected to m different first wires 21, respectively.

In addition, second common polar lines 42 of n light adjusting regions 100 in different columns and in a same row are electrically connected to n different second wires 22, respectively.

Second common polar lines 42 of m light adjusting regions 100 in the same column are electrically connected to a same second wire 22.

Figure 5:
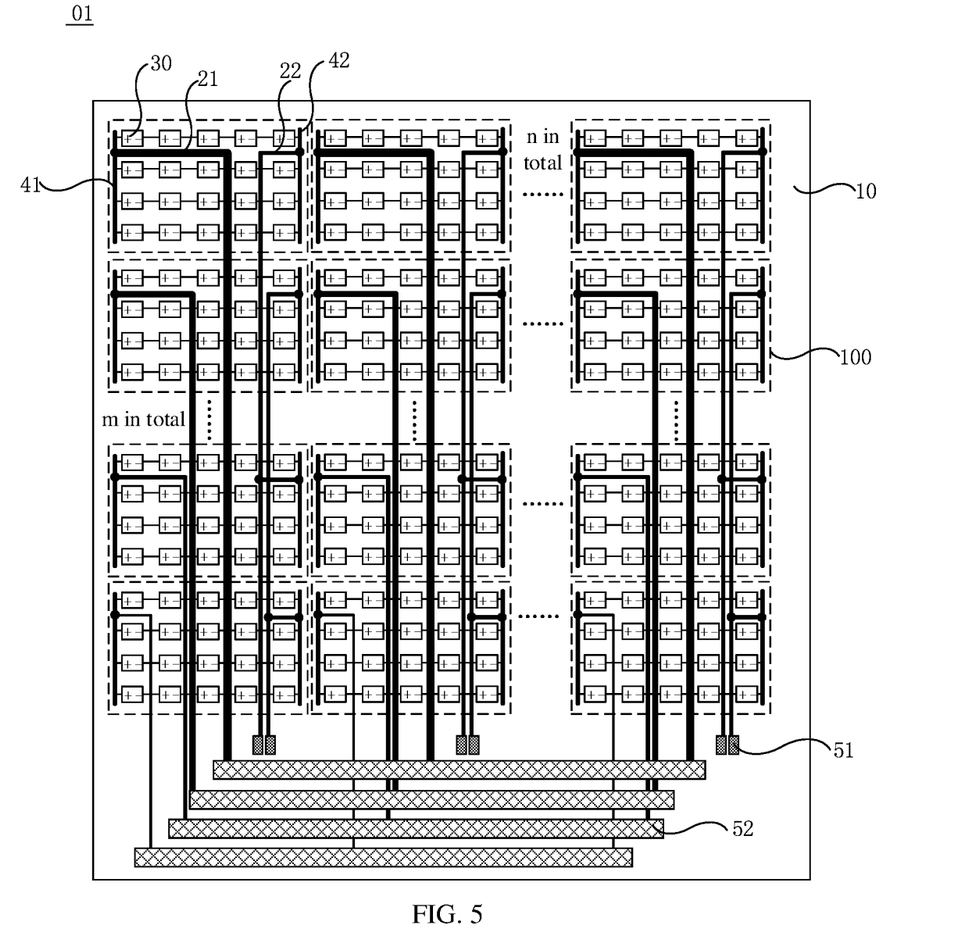
FIG. 5 is a structure diagram of another backlight source provided by at least one embodiment of the present disclosure.

For example, in some other embodiments, the connection manner of the second wire 22 and the second common polar line 42 may also be such that for m light adjusting regions 100 in the same column, as illustrated in FIG. 5, second common polar lines 42 of the light adjusting regions 100 in the odd-numbered rows are electrically connected to a same second wire 22. Second common polar lines 42 of the light adjusting regions 100 in the even-numbered rows are electrically connected to a same second wire 22. In addition, the second wire connected to the second common polar lines 42 of the light adjusting regions 100 in the odd-numbered rows and the second wire connected to the second common polar lines 22 of the light adjusting regions 100 in the even-numbered rows are different.

It should be noted that the above illustration is only an example of the connection manner of the second wire 22 and the second common polar line 42. The present disclosure does not limit the number of the second common polar lines 42 connected to one second wire 22.

For example, in some embodiments, first common polar lines of m light emitting regions 100 in a same column are electrically connected to L different first wires, respectively, and L is a positive integer greater than 0 and less than or equal to m−1; second common polar lines of n light emitting regions in different columns and in a same row are electrically connected to p different second wires, respectively, and p is a positive integer greater than 0 and less than or equal to n−1. In this case, at least two of the m light emitting regions in the same column are connected to a same first wire, and at least two of the n light emitting regions in the same row are connected to a same second wire. The above solution can also achieve adjustment of light emitting brightness of the light emitting region 100.

It should be noted that, in the embodiments of the present disclosure, the definitions of rows and columns are interchangeable, and the embodiments of the present disclosure do not limit the specific arrangement direction of rows and columns. For example, when the backlight source 01 is turned, the rows and columns are interchanged.

For example, each second wire 22 is connected to a driving circuit 511, such as a driving IC (Integrated Circuit), for providing a driving voltage to the second pole of the light emitting element 30 through a switching element, such as a multiplexer 51 (MUX). For example, a first terminal of the switching element is electrically connected to the second wire 22, and a second terminal of the switching element is electrically connected to a second driving circuit (such as a driving IC) that provides a driving voltage to the second pole of the light emitting element 30.

For example, where the driving capability of the driving IC is strong, the number of the second common polar lines 42 connected to one second wire 22 may be increased, so that the number of the multiplexers 51 provided on the base substrate 10 can be reduced. Alternatively, in order to reduce the driving capability of the above driving IC to reduce the power consumption, the number of the second common polar lines 42 connected to one second wire 22 may be reduced. In this case, the number of the multiplexers 51 on the base substrate 10 may be increased.

For example, taking one column comprising 24 light adjusting regions 100 as an example, one second wire 22 may be configured to be connected to second common polar lines 42 of four light adjusting regions 100. In this case, six second wires 22 are required for the light adjusting regions 100 of each column. In addition, six multiplexers 51 respectively connected to the six second wires 22 need to be arranged on the base substrate 10.

Alternatively, in some examples, one second wire 22 may be provided to be connected to second common polar lines 42 of three light adjusting regions 100. In this case, eight second wires 22 are required for the light adjusting regions 100 of each column. In addition, eight multiplexers 51 respectively connected to the eight second wires 22 need to be arranged on the base substrate 10.

For example, in some embodiments, the backlight source 01 further comprises a plurality of lead pins 52 electrically connected to the first wires 21 on the base substrate 10. For example, the lead pin 52 is electrically connected to a driving circuit 521 that provides a driving voltage to the first pole of the light emitting element 30, for example, the lead pin 52 is electrically connected to a driving IC that provides a driving voltage to the first pole of the light emitting element 30.

For example, in some embodiments of the present disclosure, in the case where the plurality of light emitting regions 100 are arranged in an array, as illustrated in FIG. 5, first wires 21 respectively connected to first common polar lines 41 of the light adjusting regions 100 in the same row are connected to a same lead pin 52.

Based on the above, where the brightness of each light adjusting region 100 is independently adjusted, the driving IC connected to each lead pin 52 sequentially provides voltages to the first common polar lines 41 of the light adjusting regions 100 of each row through the first wires 21 connected to the driving IC, so as to select the light adjusting regions 100 row by row.

Next, pulse width modulation (PWM) signals capable of adjusting brightness are provided to different second wires 22, so as to provide the PWM signal to the second common polar line 42 of each of the light adjusting regions 100 in the selected one row. Because the PWM signal received by the second common polar line 42 of each light adjusting region 100 is provided by an independent second wire 22, by adjusting the PWM signals received by the second common polar lines 42 of different light adjusting regions 100, light emitting brightness of each of the light adjusting regions 100 in the selected one row can be independently adjusted.

For example, the less the number of light emitting elements 30 in one light adjusting region 100 is, the greater the number of light adjusting regions 100 comprised in the whole backlight source 01 is, the higher the precision of the region light adjusting of the backlight source 01 is, and the more complicated the adjusting process is. Therefore, the number of the light emitting elements 30 comprised in one light adjusting region 100 may be selected according to the requirements for the light adjusting precision of the backlight source 01.

For example, in some embodiments, as illustrated in FIG. 5, a line width of the first wire 21 is directly proportional to a length of the first wire 21.

It should be noted that the length of the first wire 21 refers to a size from a terminal of the first wire 21 connected to the first common polar line 41 to a terminal of the first wire 21 connected to the lead pin 52. In this case, the line width of the first wire 21 connected to the first common polar line 41 of the light emitting region 100 that is far away from the lead pin 52 is larger than the line width of the first wire 21 connected to the first common polar line 41 of the light emitting region 100 that is close to the lead pin 52. The larger the line width of the first wire 21 is, the smaller the line resistance of the first wire 21 is. Therefore, in the case where currents provided by the driving IC connected to each lead pin are same, magnitudes of currents received by the first wires 21 connected to the first common polar lines 41 of the light adjusting regions 100 at different positions with respect to the lead pin 52 are substantially same, so that the precision of the region light adjusting can be improved where the light emitting brightness of each light adjusting 100 is adjusted.

For example, in the case where currents provided by the driving ICs connected to the lead pins are same, in order to further reduce the difference of the currents received by the first wires 21 connected to the first common polar lines 41 of the light adjusting regions 100 at different positions with respect to the lead pin 52, and allow the currents received by the first wires 21 to be the same, each of the first wires 21 may be configured by equal resistance matching.

For example, a ratio of the line width W to the length L of any two first wires 21 is the same. Taking m first wires 21 respectively connected to the first common polar lines 41 of the m light adjusting regions 100 in a first column as an example, from top to bottom, resistances of the m first wires 21 $Rs \times L1/W1 = Rs \times L2/W2 = Rs \times L3/W3 = \ldots Rs \times Lm/Wm$. Where Lm is a length of the mth first wire 21, Wm is a line width of the mth first wire 21, and Rs is a square resistance of the first wire 21 with a certain thickness.

Hereinafter, the arrangement manner of the first wire 21, the second wire 22, the first common polar line 41, and the second common polar line 42 is illustrated in detail.

Figure 6:
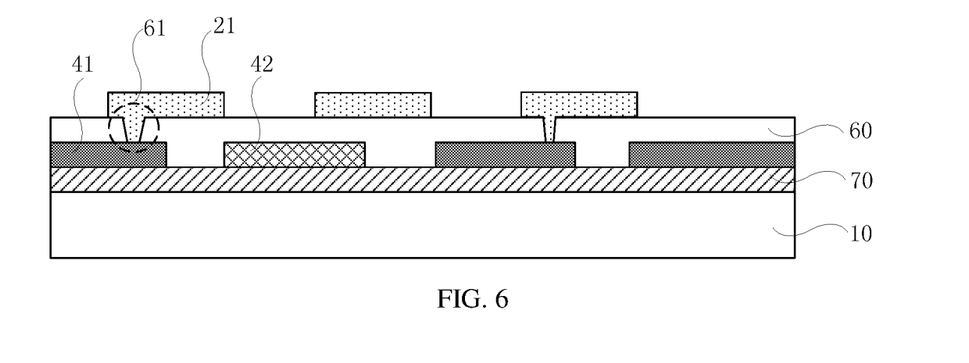
FIG. 6 is a longitudinal section diagram of a backlight source provided by at least one embodiment of the present disclosure.

For example, in some embodiments of the present disclosure, as illustrated in FIG. 6, the first common polar line 41 and the second common line 42 are in a same layer and are made of a same material. In this case, the formation of the second common polar line 42 may be completed while forming the first common polar line 41 by one patterning process.

A material for forming the first common polar line 41 and the second common polar line 42 may be a metal material, such as metal aluminum or metal copper, or an alloy material thereof.

For example, in order to allow the connection of the first common polar line 41 and the second common polar line 42 to the base substrate 10 to be better, the backlight source 01 further comprises an adhesive layer 70, the adhesive layer 70 is between the base substrate 01 and the first common polar line 41 (or the second common polar line 42), and therefore the first common polar line 41 and the second common polar line 42 are bonded to the base substrate 10 via the adhesive layer 70.

It should be noted that, in some embodiments of the present disclosure, the patterning process may comprise a photolithography process, or comprise a photolithography process and an etching process, and may further comprise other processes such as printing process, inkjet process, and so on for forming a predetermined pattern. The photolithography process comprises processes of film formation, exposure, development, and so on, and forms patterns by using a photoresist, a mask, an exposure machine, and so on. For example, a corresponding patterning process may be selected according to a structure to be formed in embodiments of the present disclosure.

For example, one patterning process in the embodiments of the present disclosure is illustrated as an example that an expected pattern is finally obtained by forming different exposure regions using one mask and exposure process, and then performing multiple removal processes, such as an etching process, an ashing process, and so on, on the different exposure regions.

For example, the first common polar line 41 (or the second common polar line 42) and the first wire 21 are in different layers. In order to allow the first common polar line 41 (or the second common polar line 42) and the first wire 21 to be arranged in differently layers, as illustrated in FIG. 6, the backlight source 01 further comprises an insulating layer 60 arranged on the base substrate 10. The insulating layer 60 is between the first common polar line 41 (or the second common polar line 42) and the first wire 21.

For example, a material of the above insulating layer 60 may be an insulating organic material or an insulating inorganic material, such as silicon nitride.

For example, in order to enable the first wire 21 to be electrically connected to the first common polar line 41, the insulating layer 60 is provided with a plurality of first via holes 61. The first wire 21 is electrically connected to the first common polar line 41 through the first via hole 61.

Figure 7:
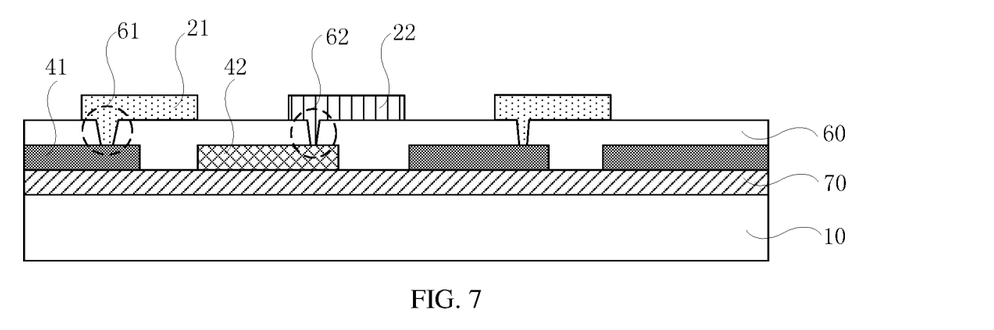
FIG. 7 is another longitudinal section diagram of a backlight source provided by at least one embodiment of the present disclosure.

For example, in some embodiments of the present application, as illustrated in FIG. 7, the second wire 22 and the first wire 21 may be in a same layer and made of a same material. In this case, the formation of the second wire 22 may be completed while forming the first wire 21 by one patterning process.

For example, a material forming the first wire 21 and the second wire 22 may be a metal material, such as metal aluminum or metal copper, or an alloy material thereof.

In this case, as illustrated in FIG. 7, the insulating layer 60 is provided with a plurality of second via holes 62. The second wire 22 is electrically connected to the second common polar line 42 through the second via hole 62.

It should be noted that the above embodiments are illustrated by taking the first wire 21 and the second wire 22 being in a same layer and made of a same material as an example. In addition, in some embodiments of the present disclosure, the first wire 21 and the second wire 22 may be arranged in different layers, that is, another insulating layer is arranged between the first wire 21 and the second wire 22. Alternatively, a part of the first wires 21 and the other part of the first wires 21 of all the first wires 21 may also be arranged in different layers. Alternatively, in some embodiments, the first wire and the first common polar line may be arranged in a same layer, and the second wire and the second common polar line are arranged in a same layer, and the first wire and the second wire are arranged in different layers. In some embodiments, the first wire and the first common polar line may be arranged in different layers, and the second wire and the second common polar line are arranged in a same layer. Alternatively, the first wire and the first common polar line are arranged in a same layer, and the second wire and the second common polar line are arranged in different layers. The present disclosure does not limit the specific arrangement manner of each wire and the common polar line. In comparison, the solution of the first wire 21 and the second wire 22 being in a same layer and made of a same material, and the first common polar line 41 and the second common polar line 42 being in a same layer and made of a same material can allow the backlight source 01 to have a thinner thickness, which is beneficial to the ultra-thin design of the display device.

Figure 8:
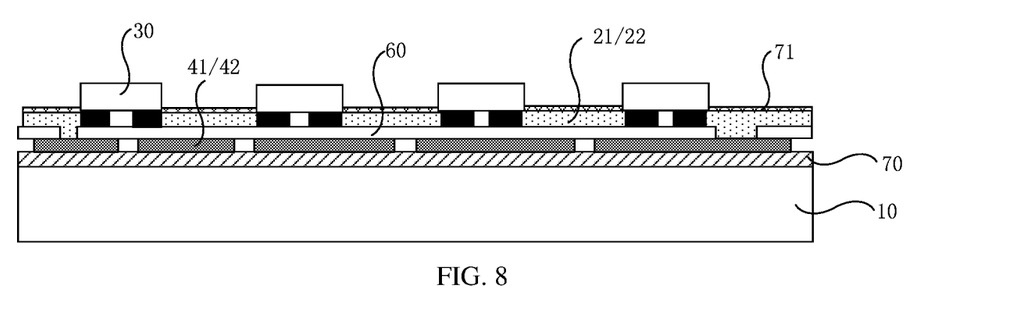
FIG. 8 is another longitudinal section diagram of a backlight source provided by at least one embodiment of the present disclosure.

For example, as illustrated in FIG. 8, the backlight source 01 further comprises a solder resist white oil 71 on a side, that is away from the base substrate 10, of the first wire 21 or the second wire 22. The solder resist white oil 71 can protect the driving circuit (comprising the first wire 21, the second wire 22, the first common polar line 41, and the second common polar line 42) for driving the light emitting element 30 to emit light. In addition, the solder resist white oil can also reflect the light emitted by the light emitting element 30, thereby improving the light emitting efficiency of the backlight source.

For example, the solder resist white oil 71 is provided with via holes for exposing pads, so that the first pole and the second pole of the light emitting element 30 can be electrically connected to the pads through the via holes. The pads are connected to the driving circuit that drives the light emitting elements 30, and therefore the light emitting elements 30 are driven to emit light by the above driving circuit.

Figure 9:
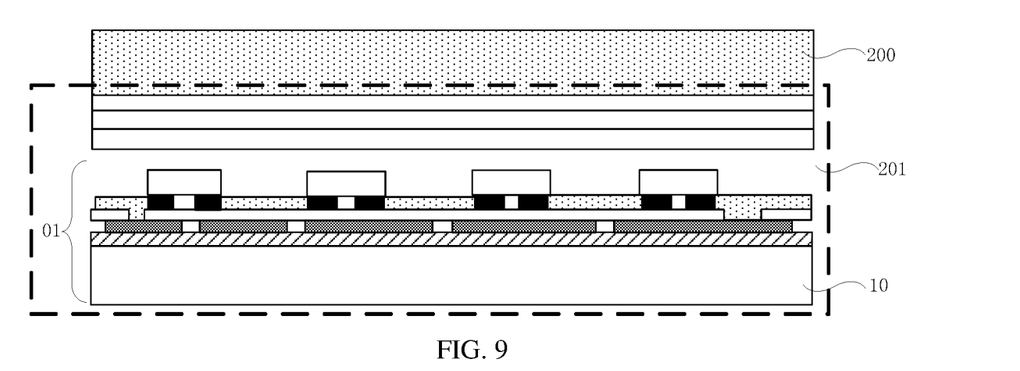
FIG. 9 is a structure diagram of a display device provided by at least one embodiment of the present disclosure.

Some embodiments of the present disclosure further provide a display device. As illustrated in FIG. 9, the display device comprises a display panel 200 (such as a liquid crystal display panel) and a backlight assembly 201. The backlight assembly 201 comprises any one of the backlight sources 01 as illustrated above. The base substrate 10 of the backlight source 01 is parallel to a light emitting surface of the display panel 200. In this case, the backlight assembly 201 of the display device is a direct type backlight assembly.

It should be noted that, in the embodiments of the present invention, the display device may be any product or component having a display function, such as a display, a television, a digital photo frame, a mobile phone, a tablet computer, or the like. The display device has the same technical effects as the backlight source 01 provided in the above embodiments, and details are not described here again.

Some embodiments of the present disclosure provide a manufacture method of a backlight source, which comprises: providing a base substrate, and dividing the base substrate into a plurality of light emitting regions; and forming a plurality of light emitting elements, a first common polar line, and a second common polar line in at least one of the light emitting regions. In a same light emitting region, first poles of the plurality of light emitting elements are electrically connected to the first common polar line, and second poles of the plurality of light emitting elements are electrically connected to the second common polar line. Hereinafter, the light emitting region may also be referred as a light adjusting region.

Figure 10:
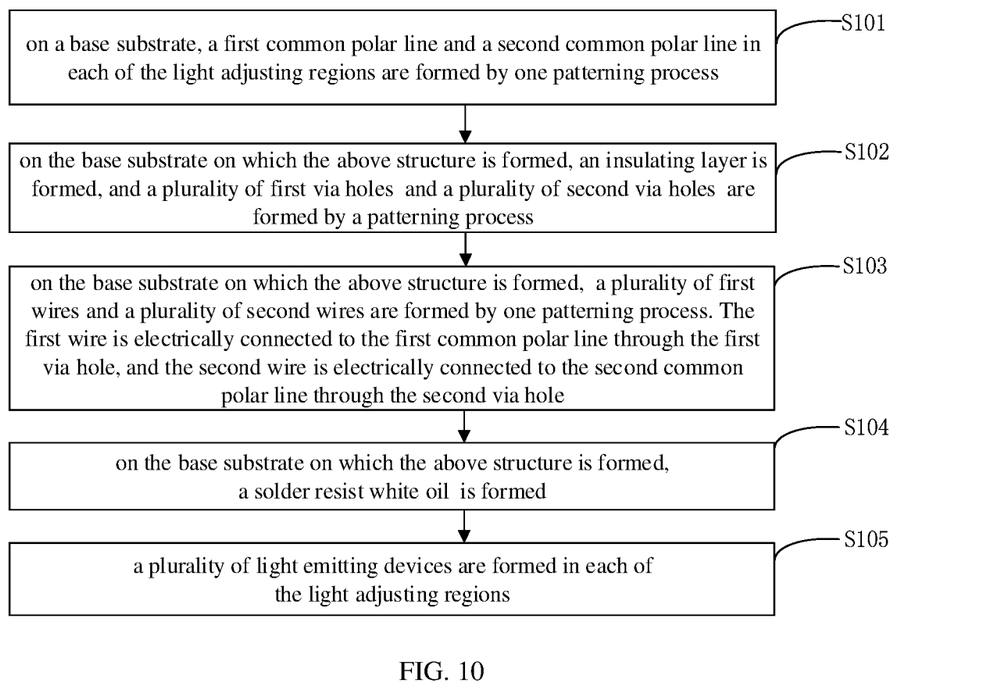
FIG. 10 is a flow diagram of a manufacture method of a backlight source provided by at least one embodiment of the present disclosure.

For example, in some embodiments, as illustrated in FIG. 10, the manufacture method of the backlight source comprises steps S101 to S105.

Figure 11:
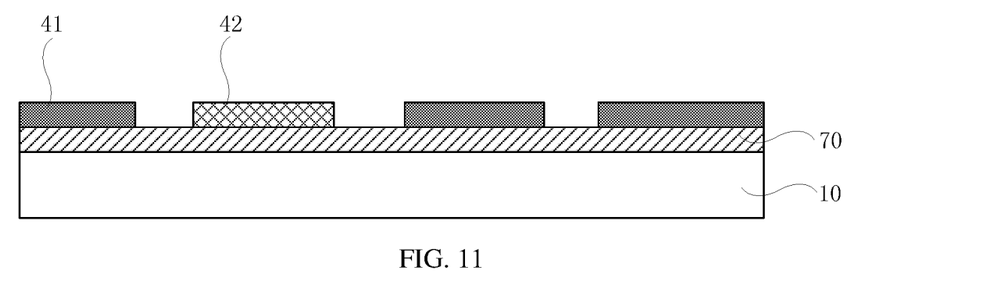
FIG. 11 and FIG. 12 are partial structure diagrams of a backlight source respectively corresponding to steps S101 and S102.

Step S101: as illustrated in FIG. 11, on a base substrate 10, a first common polar line 41 and a second common polar line 42 in each of the light adjusting regions 100 are formed by one patterning process.

It should be noted that in order to increase the adhesion between the first common polar line 41 and the second common polar line 42 made of a metal material and the base substrate 10, before the above step S101, an adhesive layer 70 may be formed on the base substrate 10.

Figure 12:
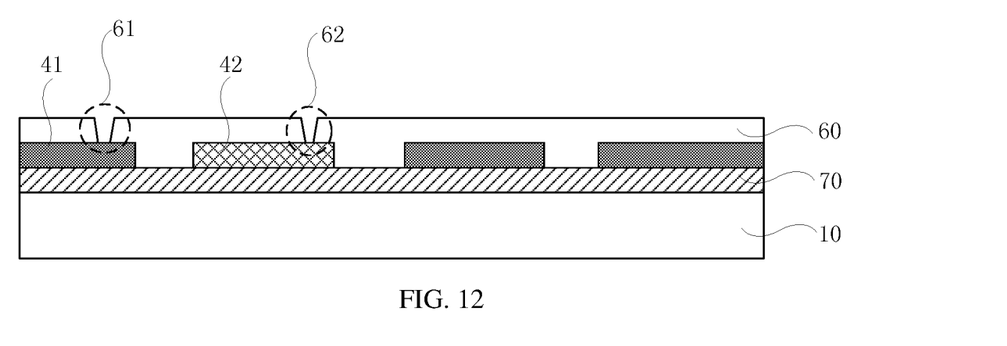

Step S102: on the base substrate on which the above structure is formed, as illustrated in FIG. 12, an insulating layer 60 is formed, and a plurality of first via holes 61 and a plurality of second via holes 62 are formed by a patterning process.

Step S103: on the base substrate on which the above structure is formed, as illustrated in FIG. 7, a plurality of first wires 21 and a plurality of second wires 22 are formed by one patterning process. The first wire 21 is electrically connected to the first common polar line 41 through the first via hole 61, and the second wire 22 is electrically connected to the second common polar line 42 through the second via hole 62.

For example, in some embodiments, in order to protect the first wire 21, the second wire 22, and so on, step S104 for forming a solder resist white oil may be selectively performed.

Step S104, on the base substrate on which the above structure is formed, a solder resist white oil as illustrated in FIG. 8 is formed.

Step S105: a plurality of light emitting elements 30 are formed in each of the light adjusting regions 100.

For example, the plurality of light emitting elements 30 are formed in each of the light adjusting regions 100 by a transfer printing process.

The manufacture method of a backlight source 01 described above has the same technical effects as the backlight source 01 provided in the above embodiments, and details are not described here again.

The following several statements should be noted:

(1) The accompanying drawings involve only the structure(s) in connection with the embodiment(s) of the present disclosure, and other structure(s) can be referred to common design(s).

(2) For clarity, in accompanying drawings for illustrating the embodiment(s) of the present disclosure, the thickness of a layer or a structure may be enlarged or reduced. However, it should understood that, in the case in which a component or element such as a layer, film, area, substrate or the like is referred to be "on" or "under" another component or element, it may be directly on or under the another component or element or a component or element is interposed therebetween.

(3) In case of no conflict, embodiments of the present disclosure and the features in the embodiments may be mutually combined to obtain new embodiments.

The above descriptions are only specific embodiments of the present disclosure, but the protection scope of the present disclosure is not limited thereto, those skilled in the art may make some improvements and modifications within the technical scope of the present disclosure, and the improvements and modifications should be within the protection scope of the present disclosure. Therefore, the protection scope of the present disclosure should be determined by the protection scope of the claims.

What is claimed is:

1. A backlight source, comprising:
    a base substrate, the base substrate being divided into a plurality of light emitting regions, and
    at least one of the plurality of light emitting regions comprising:
    a plurality of light emitting elements, a first common polar line, and a second common polar line,
    wherein light emitting brightness of at least one of the plurality of light emitting regions is adjustable independently;
    in an identical light emitting region, first poles of the plurality of light emitting elements are electrically connected to an identical first common polar line, and second poles of the plurality of light emitting elements are electrically connected to an identical second common polar line.

2. The backlight source according to claim 1, further comprising a plurality of first wires and a plurality of second wires on the base substrate,
    wherein the first common polar lines of at least two of the plurality of light emitting regions are electrically connected to different first wires, and the second common polar lines of at least two of the plurality of light emitting regions are electrically connected to an identical second wire.

3. The backlight source according to claim 2, wherein the first common polar lines of any two of the plurality of light emitting regions are electrically connected to different first wires, and the second common polar lines of at least two of the plurality of light emitting regions are electrically connected to an identical second wire.

4. The backlight source according to claim 2, wherein each of the plurality of light emitting regions is provided with i×j light emitting elements arranged in an array;
    where $i \geq 2$, $j \geq 1$, i and j are positive integers,
    i light emitting elements in an identical row are connected in series, and first poles of the plurality of light emitting elements connected in series of j rows are electrically connected to the first common polar line, and second poles of the plurality of light emitting elements connected in series of j rows are electrically connected to the second common polar line.

5. The backlight source according to claim 2, wherein the backlight source comprises n×m light emitting regions arranged in an array;
    where $n \geq 2$, $m \geq 1$; n and m are positive integers,
    the first common polar lines of m light emitting regions in an identical column are electrically connected to m different first wires, respectively; and
    the second common polar lines of n light emitting regions in different columns and in an identical row are electrically connected to n different second wires, respectively;
    wherein the second common polar lines of the m light emitting regions in the identical column are electrically connected to an identical second wire.

6. The backlight source according to claim 2, wherein the backlight source comprises n×m light emitting regions arranged in an array;
    where $n \geq 2$, $m \geq 1$; n and m are positive integers,
    the first common polar lines of m light emitting regions in an identical column are electrically connected to m different first wires, respectively; and
    the second common polar lines of n light emitting regions in different columns and in an identical row are electrically connected to n different second wires, respectively;
    for the m light emitting regions in the identical column, the second common polar lines of the light emitting regions in odd-numbered rows are electrically connected to an identical second wire; the second common polar lines of the light emitting regions in even-numbered rows are electrically connected to an identical second wire; and the second wire connected to the second common polar lines of the light emitting regions in the odd-numbered row and the second wire connected to the second common polar lines of the light emitting regions in the even-numbered rows are different.

7. The backlight source according to claim 2, wherein the backlight source comprises n×m light emitting regions arranged in an array;
    where $n \geq 2$, $m \geq 1$; n and m are positive integers,
    the first common polar lines of m light emitting regions in an identical column are electrically connected to L different first wires, respectively, and L is a positive integer greater than 0 and less than or equal to m−1;
    the second common polar lines of n light emitting regions in different columns and in an identical row are electrically connected to p different second wires, respectively, and p is a positive integer greater than 0 and less than or equal to n−1;
    wherein at least two of the m light emitting regions in the identical column are connected to an identical first wire, and at least two of the n light emitting regions in the identical row are connected to an identical second wire.

8. The backlight source according to claim 6, further comprising a plurality of lead pins provided on the base substrate and electrically connected to the first wires, and the lead pins are connected to a first driving circuit for providing a driving voltage to the first pole of the light emitting element.

9. The backlight source according to claim 2, wherein a line width of the first wire is proportional to a length of the first wire; and a ratio of the line width to the length of any two of the first wires is identical.

10. The backlight source according to claim 2, wherein the first common polar line and the second common polar line are in an identical layer, and are made of an identical material.

11. The backlight source according to claim 10, wherein the first common polar line and the first wire are in different layers;
the backlight source further comprises an insulating layer on the base substrate, and the insulating layer is between the first common polar line and the first wire;
the insulating layer is provided with a plurality of first via holes; and the first wire is electrically connected to the first common polar line through the first via hole.

12. The backlight source according to claim 11, wherein the second wire and the first wire are in an identical layer and are made of an identical material;
the insulating layer is provided with a plurality of second via holes; and the second wire is electrically connected to the second common polar line through the second via hole.

13. The backlight source according to claim 12, further comprising a solder resist white oil on a side, that is away from the base substrate, of the first wire or the second wire.

14. The backlight source according to claim 10, further comprising an adhesive layer between the base substrate and the first common polar line.

15. The backlight source according to claim 1, wherein the base substrate is a glass substrate, a sapphire substrate, a ceramic substrate or an organic resin substrate.

16. A display device, comprising a display panel and a backlight assembly, wherein the backlight assembly comprises the backlight source according to claim 1; and
the base substrate of the backlight source is parallel to a light emitting surface of the display panel.

* * * * *